United States Patent [19]

Komoto

[11] Patent Number: 5,530,839

[45] Date of Patent: Jun. 25, 1996

[54] APPARATUS FOR CHECKING ACCESS RIGHTS

[75] Inventor: Yasuhiko Komoto, Tokyo, Japan

[73] Assignee: NEC Corporation, Japan

[21] Appl. No.: 475,419

[22] Filed: Jun. 7, 1995

Related U.S. Application Data

[63] Continuation of Ser. No. 941,551, Sep. 8, 1992, abandoned.

[30] Foreign Application Priority Data

Sep. 5, 1991 [JP] Japan .................................. 3-225558

[51] Int. Cl.⁶ ..................................................... G06F 12/14
[52] U.S. Cl. .................... 395/490; 395/417; 364/DIG. 1; 364/259.9; 364/259.2; 364/265.3
[58] Field of Search ..................................... 395/479, 490, 395/491, 413, 415, 416, 417, 418, 419, 186, 188.01; 371/2.2; 380/4

[56] References Cited

U.S. PATENT DOCUMENTS

| | | |
|---|---|---|
| 4,525,780 | 6/1985 | Bratt et al. ............................. 395/490 |
| 4,890,223 | 12/1989 | Cruess et al. ........................... 395/491 |
| 4,949,238 | 8/1990 | Kamiya .................................. 395/491 |
| 5,043,878 | 8/1991 | Ooi ........................................ 395/375 |
| 5,140,684 | 8/1992 | Sakamura et al. ...................... 395/490 |
| 5,249,276 | 9/1993 | Honmura et al. ....................... 395/417 |
| 5,265,227 | 11/1993 | Kohn et al. ............................. 395/417 |

Primary Examiner—Glenn Gossage
Assistant Examiner—Hiep T. Nguyen
Attorney, Agent, or Firm—Whitham, Curtis, Whitham & McGinn

[57] ABSTRACT

An improved access right checking apparatus is provided which has a selector permitting high speed access right checking in a different execution level than a processor current execution level. The selector may select either a processor current execution level or an execution level in which access rights are checked. Information of the access right checking request including the execution level is transmitted through a data bus to a decoder, after which the information is decoded and fetched as a selective signal. The selective signal is applied to the selector. When the access right checking performance is requested, the selector permits the processor current execution level to be temporarily switched into a predetermined execution level in which the access rights are checked.

2 Claims, 3 Drawing Sheets

APPARATUS FOR CHECKING ACCESS RIGHTS

This application is a continuation of application Ser. No. 07/941,551, filed Sep. 8, 1992, now abandoned.

BACKGROUND OF THE INVENTION

The invention relates to a memory protection feature on a virtual memory management by paging or segment systems, and more particularly to a feature for checking right of access to an unauthorized memory area.

Microprocessors or large computers uses a virtual memory system which permits the execution of a program, codes of which requires a larger capacity than that of a memory accommodated in the device. In the virtual memory system, a logical address space provided by a processor, or an address space visible to the program is divided into a plurality of unit areas, or pages or segments. The program is commonly stored in an auxiliary storage device which has a large storage capacity sufficient for the program.

For the execution of the program, a partial program which is required for a current execution of the processor is loaded from the auxiliary storage device into the memory accommodated in the processor. If the required partial program is unloaded in the memory, an unnecessary partial program in the memory is served into the auxiliary storage device. In replacement of the saved partial program, the required partial program is loaded from the auxiliary storage device into the memory. Such a transmission of the partial program between the memory and the auxiliary storage device is executed in a page unit or a segment unit.

While the loading of the partial program into the memory is accomplished by such procedures, normally a real address on the memory does not correspond to the logical address, or the virtual address which is visible to the program. The processor using the virtual memory system, therefore, requires a translation from the virtual address into the real address for performance of the access to the memory. The processor, thus, includes an address translation table on the memory which determines the correspondence between the virtual address and the real address.

Such processors are, however, engaged with a disadvantage of delays of an instruction execution time due to the address translation from the virtual address to the real address. Further, since the address translation table exists in a real address space in the memory, access to the address translation table is affected by delays of the access time to the memory. It is, thus, difficult to realize a high speed address translation.

To combat the above disadvantage, the normal processor includes an address translation look-aside buffer (TLB) in a chip which permits the high speed translation execution. Results of the address translation by the address translation table is cached in the address translation look-aside buffer (TLB). The access to the memory is executed according to the real address cached in the address translation look-aside buffer (TLB), only when the virtual address accessed hits the results of the address translation cached in the address translation look-aside buffer (TLB).

On the other hand, the virtual memory system permits a small memory space to be expanded into a large dummy memory space as well as a protection of the memory from unauthorized access. This feature may suppress the unauthorized access opposite to access informations of both the virtual address and the correspondence real address on the address translation table. For instance, an execution environment of the processor may be sorted in an application level and an operating system level so that a program to be operated in the application level may not access to a virtual space in the operating system level. Those prevent an accidental destruction of the operating system program due to the run away of the application program or the unauthorized access.

In addition, each page or segment of the virtual address space is sorted into predetermined attributes such as execute enable pages, read enable pages and write enable pages so that unauthorized access opposite to the predetermined attributes may be detected. Results of the detection post logical mistakes in the program to stop the execution of the program. From the set forth description, it is understood that the virtual memory system is generally provided with not only the address translation feature but the memory protection feature. In the processor having the memory protection feature, a program determines rights of access to an optional virtual access. The conventional processor possesses both the address translation feature and the memory protection feature that will now be described with referring to FIG. 1. The processor includes an address translation feature and an address protection feature. In the processor, an address translation look-aside buffer (TLB) 200 comprises an associative random access memory (ARAM) 201 having a plurality of entries and a data random access memory (DRAM) 202 having the same numbers of entries as the ARAM 201. A processor execution level register (PEL) 205 preserve a processor current execution level. A decoder (DEC) 206 decodes access informations associated with the virtual address. A processor access right testing feature (PROT) 207 checks rights of access. A storing address translation register (STAT) 208 stores protection informations of the address translation results. A read enable processor control circuit (REPCONT) 209 enables the TLB 200 to read the address translation table. An address bus (ABUS) 210 connects the REPCONT 209 with an external memory to the processor. A data bus (RABUS) 214 transmits the real address as the address translation results to the DRAM 202. A data bus (DBUS) 211 connects the external memory to the RABUS 214. A data bus (VABUS) 212 transmits the virtual address to the ARAM 201 or the protection information of the address translation results to the STAT 208. A data bus (VTBUS) 213 transmits access informations associated with the virtual address to be transmitted into the DEC 206.

In the operation of the address translation, the virtual address informations and those access informations such as read, write or execution which are associated with the virtual address are transmitted through the VABUS 212 and the VTBUS 213 respectively. The virtual address transmitted through the VABUS 212 is compared with each entry of the ARAM 200 in the TLB 200. When the virtual address hits any one of the entries, a hit signal 203 is taken into "1". When the virtual address does not hit any one of the entries, the hit signal 203 is taken into "0". When the hit signal 203 is "1", a specific entry of the DRAM 202 is selected by a selective signal 204 by which the real address corresponding to the virtual address is outputted from the DRAM 202 to the RABUS 214. When the hit signal is "0", the REPCONT 209 is stated to control the ABUS 210 thereby enabling the RABUS 214 to read contents of the address translation table, or the real address and the memory protection informations in the external memory through the DBUS 211. The virtual address transmitted through the VABUS 212 and the contents of the address translation table transmitted through the RABUS 213 are stored in any one of entries of the ARAM 201 and a correspondence entry thereto of the DRAM 202. This feature permits the virtual address to surely hit any one of entries of the ARAM 201. The protection informations stored in the entries of the DRAM 202 in the TLB 200 and access informations posted through the PEL 205 and the VTBUS 213 are decoded by the DEC 206. The checking of the access rights is executed by the PROT 207 according to the results of the DEC 206. The checking results of the access right is stored in the STAT 208.

FIG. 2 illustrates one specific entry 100 of the DRAM 202 corresponding to the virtual address which hits to any one of the entries of the ARAM 201 in the TLB 200. The specific entry 100 may store a plurality of contents of the address translation table as the protection informations, for instance, a real address (RADR) 101, an execution enable level (EEL) 102, a read enable level (REL) 103, a write enable level (WEL) 104, an execution enable (E) 105, a read enable (R) 106 and a write enable (W) 107. Comparators (COMP) 108, 109 and 110 compare the PEL 205 with the EEL 102, the REL 103 and WEL 104 respectively. As the results of the comparison, when the PEL 205 is the access enable level, the output of the each comparators is "1". When the PEL 205 is not the access enable level, the output of the each comparators is "0". The output of the comparator shows the result of the checking of the access right for the processor execution level (PEL) 205. Each of AND gates 111, 112 and 113 permits the output of the each comparators 108, 109 and 110 to be ANDed with each of the execution enable (E) 105, the read enable (R) 106 and the write enable (W) 107. The outputs of the AND gates 111, 112 and 113 serve as determination signals of the access rights for execution, read and write of the PEL 205 respectively. The DEC 206 decodes the access informations accompanied with the virtual address, which are transmitted through the VTBUS 213 thereby creating an execution access signal 114, a read access signal 115 and a write access signal 116. When each access is authorized, each of the signal 114, 115 and 116 is "1". When each access is unauthorized, each of the signals 114, 115 and 116 is "0". NAND gates 117, 118 and 119 permit outputs of the AND gates 111, 112 and 113 to be NANDed with the signals 114, 115 and 116 respectively. When at least any one of outputs of the NAND gates 117, 118 and 119 is "1", there is an unauthorized protection in the access informations executing the address translation. The outputs of the NAND gates 117, 118 and 119 are preserved in the register (STAT) 208 and read out through the VABUS.

Referring to FIGS. 1 and 2, when the access right checking is required, the virtual address to be checked is posted through the VABUS 212 and the checking informations are posted through the VTBUS 213. The checking informations include the execution level and the access informations such as execution, read and write. When the virtual address to be checked does not hit the entries of the ARAM 201 in the TLB 200, contents in the ARAM 201 and the DRAM 202 are updated. The PROT 207 checks the access rights. When there is no unauthorized protection, the virtual address is enabled to access. The execution level comparison is executed by comparing the PEL 205 with the EEL 102, the REL 103 and the WEL 104 stored in the entries of the DRAM 202. If the execution level in which the access rights are checked, which is transmitted through the VTBUS 213 does not correspond to the PEL 205, checking results are incorrect. Those requires another means such as a microprogram for performance of the access right checking.

The access right checking results depends upon whether or not the execution level in which the access rights are checked corresponds to the processor execution level PEL 205. When the execution level in which the access rights are checked does not correspond to the PEL 205, a performance of the access right checking by the micro-program requires following steps. A first step is a calculation of the real address on the address translation table in which both the real address corresponding to the virtual address and the protection informations are stored. A second step is a read performance of the contents of the address translation table into the processor by controlling both the ABUS and the DBUS. A third step is a checking performance of the access rights of execution, read and write. A final step is a checking performance of the attributes of the execution, read and write. When the virtual address for checking the access rights does not hits the TLB, the first and second steps are required. In replacement of the micro-program, the first step may, however, be executed by only hardware so that the execution speed is higher than that of the micro-program by at least one clock. The third and fourth steps may be executed in one clock time by software. In contrast, the micro-program requires at least six clocks due to two sets of arithmetic, checking and decision performances. If the execution level in which the access rights are checked does not correspond to the processor current execution level, the performance by the micro-program requires unnecessary times of six clocks.

Another method in replacement of the micro-program requires not only the above address translation feature and the memory protection feature but an executive hardware of the same scale as the above hardware.

SUMMARY OF THE INVENTION

Accordingly, it is an object of the present invention to provide an improved feature capable of a high speed access right checking in a different execution level to a processor current execution level by providing an additional simple feature.

The above and other objects, features, and advantages of the present invention will be apparent from the following descriptions.

There is provided an improved access right checking apparatus which has analogous features to that of the prior art except a selector. The selector may select either a processor current execution level or an execution level in which access rights are checked. Informations of the access right checking request including the execution level are transmitted through a data bus to a decoder, after which the informations are decoded and fetched as a selective signal. The selective signal is applied to the selector. When the access right checking performance are requested, the selector permits the processor current execution level to be temporary switched into a predetermined execution level in which the access rights are checked.

BRIEF DESCRIPTION OF THE DRAWINGS

Preferred embodiments of the present invention will hereinafter fully be described in detail with reference to the accompanying drawings.

PREFERRED EMBODIMENTS OF THE INVENTION

Figure 1:
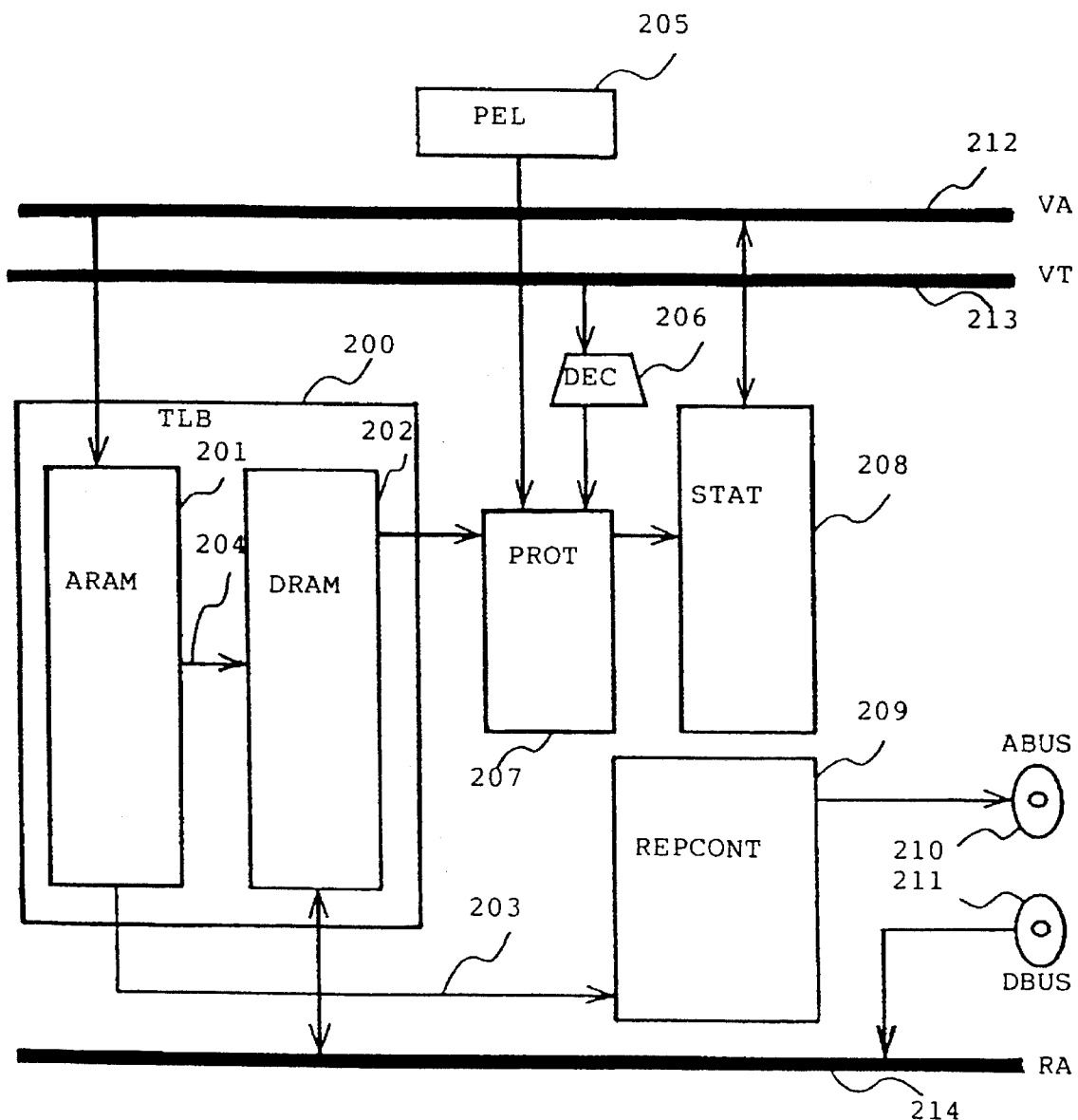
FIG. 1 is a diagram illustrative of an address translation feature and a memory protection feature of the piror art.
Figure 2:
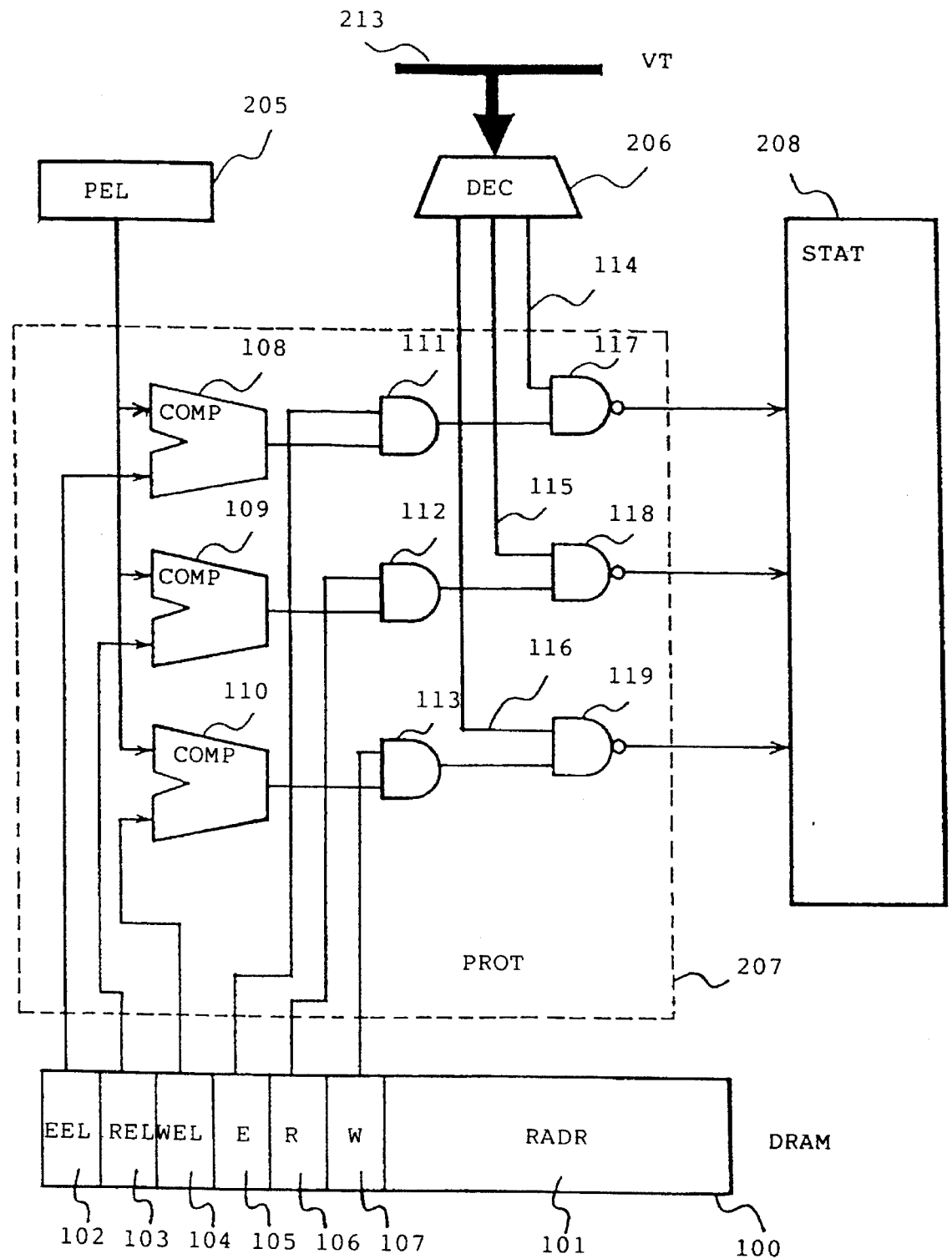
FIG. 2 is a diagram illustrative of an access right checking feature of the prior art.
Figure 3:
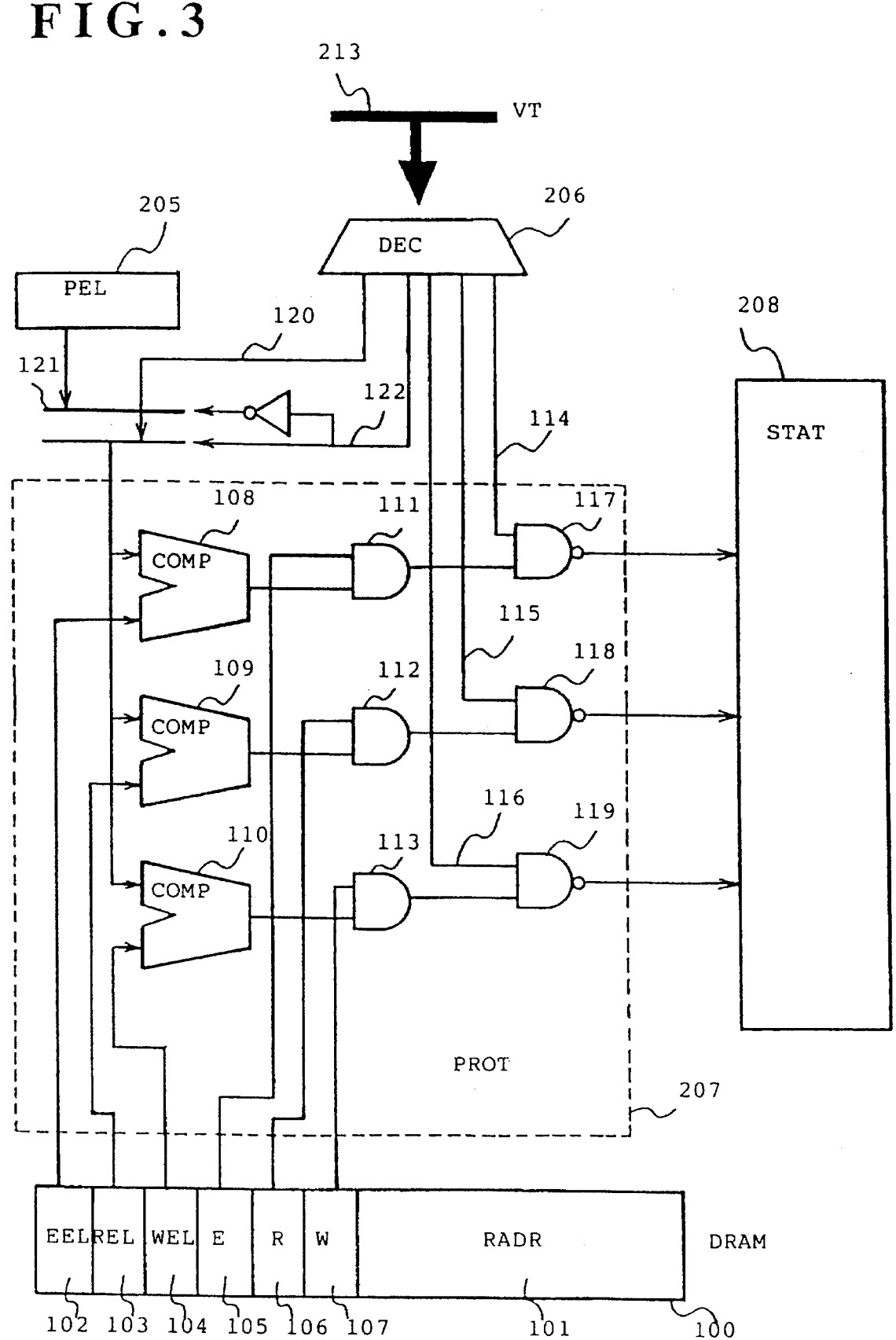
FIG. 3 is a diagram illustrative of a novel access right checking feature of one embodiment according to the present invention.

Referring to FIG. 3, an access right checking apparatus according to the invention is analogous to the prior art, except a selector 121 for selecting any one of a processor current execution level (PEL) 205 and an access right checking execution level 120. The access right checking execution level 120 is fetched from a decoder (DEC) 206 which decodes access right checking informations transmitted through a data bus (VTBUS) 213. The selector 121 is applied with a selective control signal 122 fetched from the DEC 206. The processor including the improved access right checking apparatus according to the invention may comprise analogous features to that illustrated in FIG. 1 as the prior art. The access right checking apparatus according to the invention includes contents 101 to 107 of the DRAM 202 in the TLB 200, comparators 108, 109 and 110, AND gates 111, 112 and 113, access attribute signals 114, 115 and 116 such as execute, read and write, NAND gates 117, 118 and 119, PEL 205, DEC 206, PROT 207, STAT 208 and VTBUS 213, all of which may be the same as the prior art.

An address translation request and an access right checking request are respectively posted to the address translation feature and the memory protection feature through the VTBUS 213. The address translation request and the access right checking request include access execution informations of the attribute such as execution, read and write which are decoded by the DEC 206 and fetched from the DEC 206 as the attribute signals 114, 115 and 116, or execute, read and write. The informations of the access right checking request which is posted through the VTBUS 213 further includes a information of the execution level in which access rights are checked. The informations of the access right checking request including the execution level are decoded by the DEC 206 and fetched as the signal 120. Concurrently, the selective control signal 122 is fetched from the DEC 206 and applied to the selector 121 thereby permitting the selector 121 to select either the PEL 205 when the address translation is requested or the execution level 120 when the access right checking is requested. In such an access right checking feature, the processor current execution level is momentarily switched into an execution level in which access rights are checked so that the address translation is executed thereby permitting the unauthorized memory protection to be checked. When there is no unauthorized memory protection, or all outputs of the NAND gates 117, 118 and 119 are "0", the memory is accessible. In contrast, when unauthorized memory protection, or at least any one of outputs of the NAND gates 117, 118 and 119 is "1", the memory is not accessible. After the access rights are determined, the selective control signal 122 is applied into the selector 121 thereby permitting the selector 121 to select the PEL 205. Other operations are analogous to that of the prior art. Whereas modifications of the present invention will no doubt be apparent to a person of ordinary skilled in the art, it is to be understood that the embodiments shown and described by way of illustration are by no means intended to be considered in a limiting sense. Accordingly, it is to be intended by the claims to cover all modifications of the invention which fall within the spirit and scope of the invention.

What is claimed is:

1. An apparatus employed in a data processor comprising:

an address bus provided for transferring a virtual address information;

a data bus provided for transferring a request information accompanied with said virtual address information, said request information including any one of an address translation request and an access right checking request;

an address translation look-aside buffer coupled to said address bus to receive said virtual address information, said address translation look-aside buffer including a plurality of entries each temporarily storing a real address information and an access protection information and means responsive to said virtual address information for selecting one of said entries which is hit by said virtual address information;

a register for temporarily storing a current execution level information of said data processor;

a decoder means, coupled to said data bus to receive said request information, for producing a first control signal when said request information includes said address translation request and a second control signal when said request information includes said access right checking request, said decoder means further producing, when receiving said access right checking request, an access right checking information;

a selector means, coupled to said register and said decoder means, for selecting said current execution level information when said first control signal is produced and for selecting said access right checking information when said second control signal is produced; and an access checking unit, coupled to said address translation look-aside buffer and said selector means, for checking whether or not an access responsive to said real address information of said one of said entries is allowed in response to said access protection information and one of said current execution level information and said access right checking information which is selected by said selector means.

2. The apparatus as claimed in claim 1, wherein said selector means comprises a switch including first and second terminals, said first terminal being coupled to said register for receiving said current execution level information of said data processor, said second terminal being coupled to said decoder means via an access right checking information transmission line for receiving said access right checking information, said switch being coupled to said decoder means via both an access right checking request transmission line and an address translation request transmission line, said switch being arranged to permit connecting said first terminal to said access checking unit when receiving a control signal via said address translation request transmission line as well as connecting said second terminal to said access checking unit when receiving a control signal via said access right checking request transmission line.

* * * * *